(12) United States Patent
Cornelius

(10) Patent No.: US 11,234,561 B1
(45) Date of Patent: Feb. 1, 2022

(54) SHAKER CUP

(71) Applicant: Derek W Cornelius, Cape Girardeau, MO (US)

(72) Inventor: Derek W Cornelius, Cape Girardeau, MO (US)

( * ) Notice: Subject to any disclaimer, the term of this patent is extended or adjusted under 35 U.S.C. 154(b) by 0 days.

(21) Appl. No.: 15/197,367

(22) Filed: Jun. 29, 2016

Related U.S. Application Data

(63) Continuation-in-part of application No. 29/558,164, filed on Mar. 15, 2016, now Pat. No. Des. 780,516.

(51) Int. Cl.
*A47J 43/27* (2006.01)
*B65D 8/00* (2006.01)
*B65D 25/48* (2006.01)
*B65D 43/02* (2006.01)

(52) U.S. Cl.
CPC .............. *A47J 43/27* (2013.01); *B65D 11/02* (2013.01); *B65D 25/48* (2013.01); *B65D 43/0231* (2013.01)

(58) Field of Classification Search
CPC .. A47J 43/27; B65D 1/12; B65D 1/14; B65D 1/16; B65D 1/18; B65D 11/02; B65D 21/02; B65D 21/0201; B65D 21/0209; B65D 21/0212; B65D 21/0213; B65D 21/0233; B65D 23/04; B65D 25/48; B65D 43/0231; B65D 85/72; B65D 85/80; B65D 43/0202; B65D 43/0204; B65D 43/0206; B65D 43/0208; B65D 43/021; B65D 43/0212; B65D 43/0225; B65D 43/0227; B65D 43/0229; B01F 13/0018; B01F 13/002; B01F 13/0022; B01F 13/0033

USPC .................. 206/219, 220, 221; 366/129, 130
See application file for complete search history.

(56) References Cited

U.S. PATENT DOCUMENTS

| | | | | |
|---|---|---|---|---|
| 1,765,129 A | * | 6/1930 | Cooke | A47J 43/27 215/40 |
| 2,208,431 A | * | 7/1940 | Rochow | A47J 43/27 220/669 |
| 3,307,752 A | | 3/1967 | Anderson | |
| 3,820,692 A | * | 6/1974 | Smith et al. | B65D 47/0895 222/547 |
| 4,818,114 A | * | 4/1989 | Ghavi | A47J 43/27 215/11.1 |
| 5,419,429 A | * | 5/1995 | Zimmerman | A47J 43/27 206/222 |
| 5,547,275 A | * | 8/1996 | Lillelund | A47J 43/27 215/DIG. 8 |
| 6,913,165 B2 | * | 7/2005 | Linz | A47J 43/27 220/568 |

(Continued)

OTHER PUBLICATIONS

Solutions4 NPL, published Aug. 17, 2011, https://www.solutions4.com/solutions4-nutritional-shakes/ (Year: 2011).*

*Primary Examiner* — Drew E Becker
*Assistant Examiner* — Bryan Kim
(74) *Attorney, Agent, or Firm* — Kevin J. O'Shea

(57) ABSTRACT

Apparatus for agitation of liquid and powder mixtures. The apparatus includes a vessel combining a tapered annular side wall of the body of the vessel, an angled top inner surface of the cap portion which creates greater turbulence, and a particular length to average diameter ratio. The interruption of currents to create shear, turbulence and eddy currents of the liquid within the vessel provides greater mixing of the powder within the liquid.

12 Claims, 5 Drawing Sheets

(56) References Cited

U.S. PATENT DOCUMENTS

| | | |
|---|---|---|
| D537,676 S | 3/2007 | Kingsley |
| 7,694,843 B2 * | 4/2010 | Hollis .................. B65D 1/28 |
| | | 220/703 |
| 7,866,183 B2 * | 1/2011 | Roth .................. A47J 36/2416 |
| | | 62/457.3 |
| D638,658 S | 5/2011 | Staton |
| D646,919 S | 10/2011 | Nilsson |
| 8,240,497 B2 * | 8/2012 | Kountotsis ............... B65D 1/04 |
| | | 215/6 |
| 8,403,173 B2 | 3/2013 | Wahl |
| D687,661 S | 8/2013 | Cetera |
| D690,989 S | 10/2013 | Cetera |
| D691,849 S | 10/2013 | Cetera |
| D692,276 S | 10/2013 | Cetera |
| D699,996 S | 2/2014 | De Leo |
| 8,695,830 B2 | 4/2014 | Meyers |
| D726,476 S | 4/2015 | Ercanbrack |
| D730,694 S | 6/2015 | Elsaden |
| D739,174 S | 9/2015 | Elsaden |
| D739,674 S | 9/2015 | Bergstrom |
| 9,216,843 B2 | 12/2015 | Sorensen |
| D748,478 S | 2/2016 | Sorensen |
| D752,382 S | 3/2016 | Ksiazek |
| D758,127 S | 6/2016 | Zhao |
| D763,688 S | 8/2016 | Breit |
| 9,420,920 B2 * | 8/2016 | Holmes .................. A47J 43/27 |
| D772,652 S | 11/2016 | Yao |
| 9,714,121 B2 * | 7/2017 | Gamelli ............... B65D 47/122 |
| D807,110 S | 1/2018 | Lown |
| D817,085 S | 5/2018 | Davis |
| 10,039,422 B2 * | 8/2018 | Fouad .................... A47J 43/27 |
| 2011/0111101 A1 * | 5/2011 | Yourist .................... A23L 2/00 |
| | | 426/232 |
| 2012/0061398 A1 * | 3/2012 | Nilsson .................. A47J 43/27 |
| | | 220/568 |
| 2015/0048086 A1 * | 2/2015 | Brown ............... B65D 81/3869 |
| | | 220/62.11 |
| 2015/0076151 A1 * | 3/2015 | Knipe ................ B65D 43/0212 |
| | | 220/254.3 |
| 2016/0130042 A1 * | 5/2016 | Gascoine ............... B65D 41/04 |
| | | 206/438 |
| 2017/0107023 A1 | 4/2017 | Miskovsky |

* cited by examiner

SHAKER CUP

FIELD

This invention relates, generally, to shaker cups and water vessels. More specifically, this invention relates to an inventive, reusable shaker cup designed to efficiently mix powdered material with water without the use of a mixing element.

BACKGROUND

For some time, people have recognized the need to stay hydrated. Conventionally, many individuals carry drink containers that hold water or other potable beverages. These drink containers typically include a bottle that is formed from plastic or metal. These containers also frequently include a cap, which is removably secured to a neck or other opening of the bottle. Some bottles include a threaded neck from which a user drinks liquid contained in the bottle after removal of the cap. In some conventional drink containers, the cap is tethered to the bottle so that upon removal of the cap, the cap does not become lost, misplaced, or otherwise separated from the bottle. Illustrative, non-exclusive examples of such drink containers include a threaded cap that is tethered to the neck of the container. Some conventional drink containers include a drink spout, or nozzle, that is integral with the cap. Some drink containers allow the liquid to be drawn from the drink bottle without removal of the cap from the bottle, such as squeezable drink containers with push-pull drink spouts and drink containers with bite-actuated mouthpieces. Others merely have a cap covering the spout which is removed to drink the liquid within the vessel.

Still further, certain drink containers are used to mix powdered, dry ingredients into liquids. Illustrative, non-exclusive examples are mixing flavors, dietary supplements or food-based powders into liquids. Protein powders are particularly popular powders that are mixed into water for human consumption. It has previously been thought that to effectively and quickly mix such powders with water, a mixing element was needed to quickly or fully dissolve the powder into the water. Such devices range from water vessels containing a ball within the vessel to mix the powder, or more complex structures that contain wire mixing elements, that move within the water vessel as it is shaken to and fro. Examples of such mixing elements are contained in U.S. Pat. Nos. D736,559, D723,325 and 6,379,032.

U.S. Pat. No. 6,379,032 issued to Sorenson describes a wire-frame mixing element that is allowed to move within the vessel and which the inventor claims is effective mixing powders into liquids. Moreover, such mixing elements are an annoyance when drinking because, as the water vessel is tilted to drink, the mixing element clanks and bumps in the vessel while drinking. Mixing elements also add unnecessary additional cost to a drinking vessel and must be made from a food-safe material. Furthermore, mixing elements must be separately cleaned apart from the bottle and can easily be lost.

Other attempts at creating a bottle with a mechanical mixing apparatus have met with little success and excess complexity. U.S. Pat. No. 4,818,114 issued to Ghavi is for a device for attachment to a bottle for facilitating mixing of solid food particles into a liquid. The shaker top consists of a circular-dome shaped mixing chamber for attachment to the bottle. A mixing disc having spaced arms radiating from a center post which is shaped to produce a multitude of shear points for increasing a cutting action during the shaking process. The mixing disc accommodates the movement of the liquid and particles into the mixing chamber and back into the bottle.

McClean in U.S. Pat. No. 4,872,764 discloses a beverage processing apparatus consisting of an outer housing forming a vessel for containing a beverage mixture. An upper portion of the vessel contains a motor that drives a shaft having processing blades for mixing a beverage including ice cubes. The blades are inwardly inclined to promote folding in the event of striking an obstacle during processing.

U.S. Pat. No. 5,911,504 issued to Schindlegger, Jr. is for a stirring device for a container which includes a housing having inner threads for mating with the container. A drive shaft for stirring extends through the housing, and batteries supply power to stir liquid within the container.

All of these devices are too complex, have additional parts to clean and are too expensive. The prior art reveals a need for a water bottle which facilitates greater turbulence, shear and eddy currents within the vessel when shaking but does not require the use of additional, separate, and loose mixing elements or electromechanical components.

SUMMARY

The present invention relates to an improved apparatus for the mixing of liquid and powder during a shaking process. The apparatus comprises a vessel combining a long, slender and tapered annular side wall of the body of the vessel and angled top inner surface of the cap portion, the combination of which create greater turbulence and interruption of liquid flow and create eddy currents of the liquid within the vessel which provides greater mixing of the powder within the liquid to more quickly and completely mix the powder into the liquid.

DESCRIPTION OF THE PREFERRED EMBODIMENT

Figure 1:
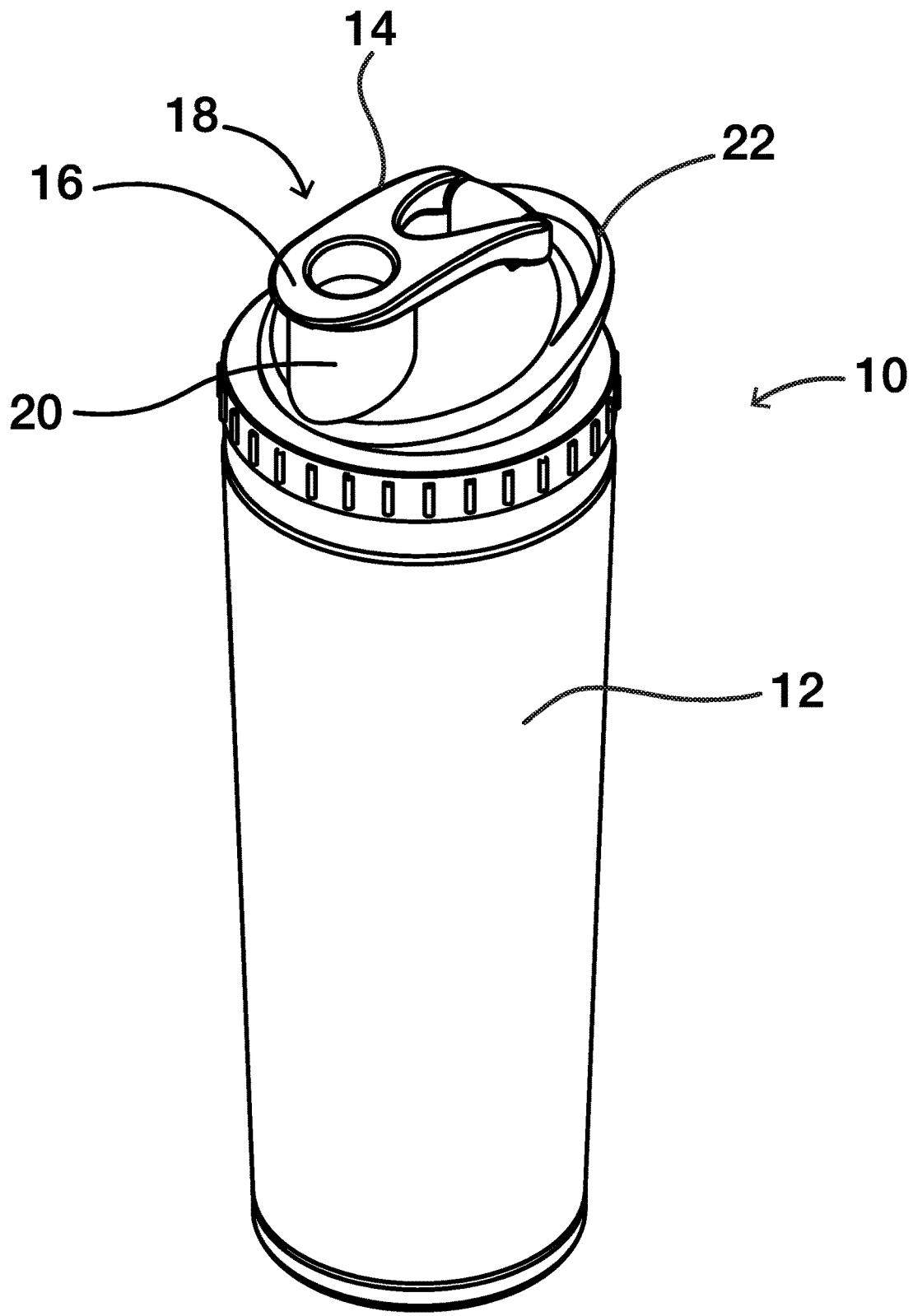
FIG. 1 is a quarter perspective view of a shaker cup according to an embodiment of the present invention.
Figure 2:
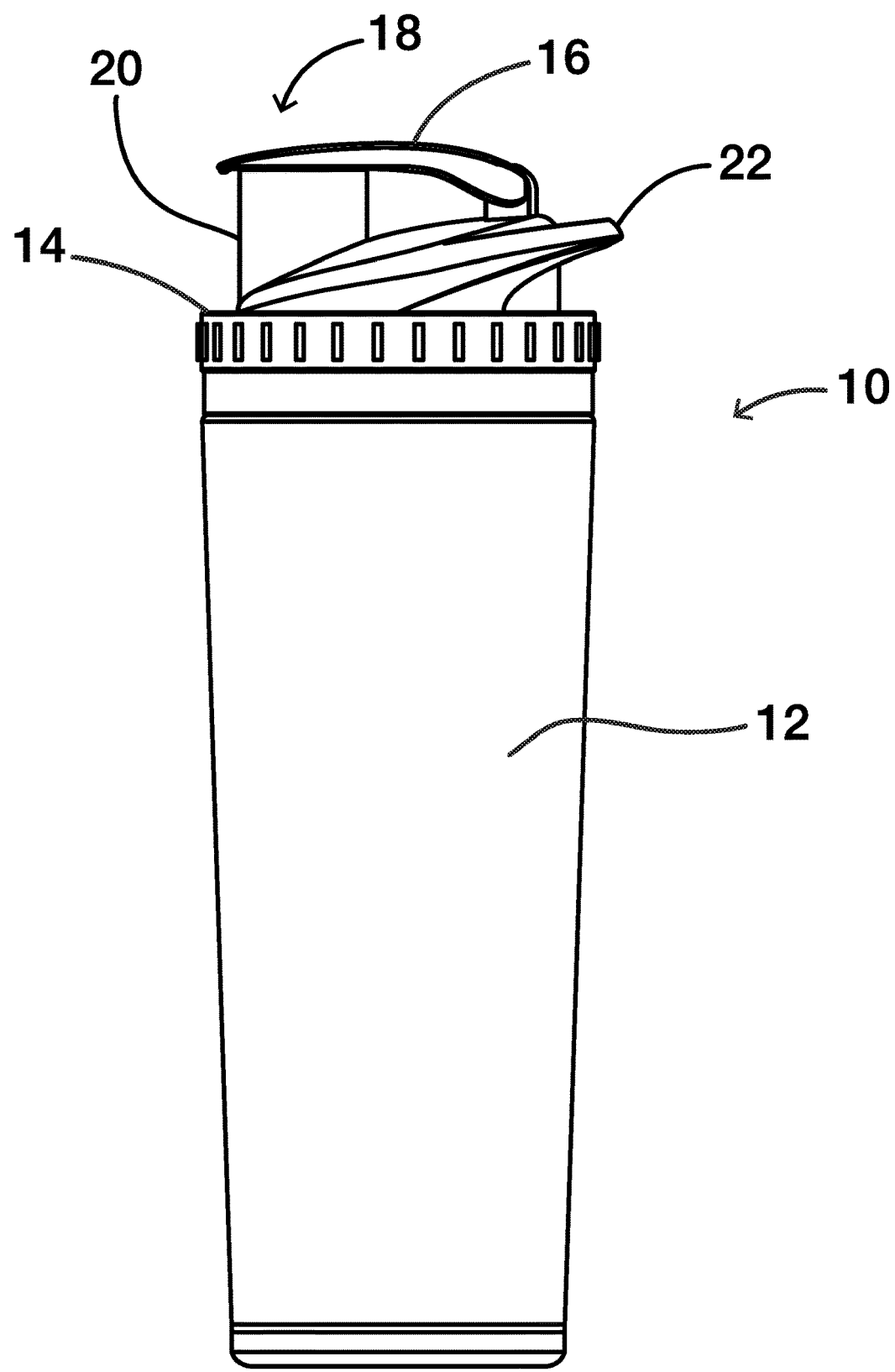
FIG. 2 is a front view of a shaker cup according to an embodiment of the present invention.
Figure 3:
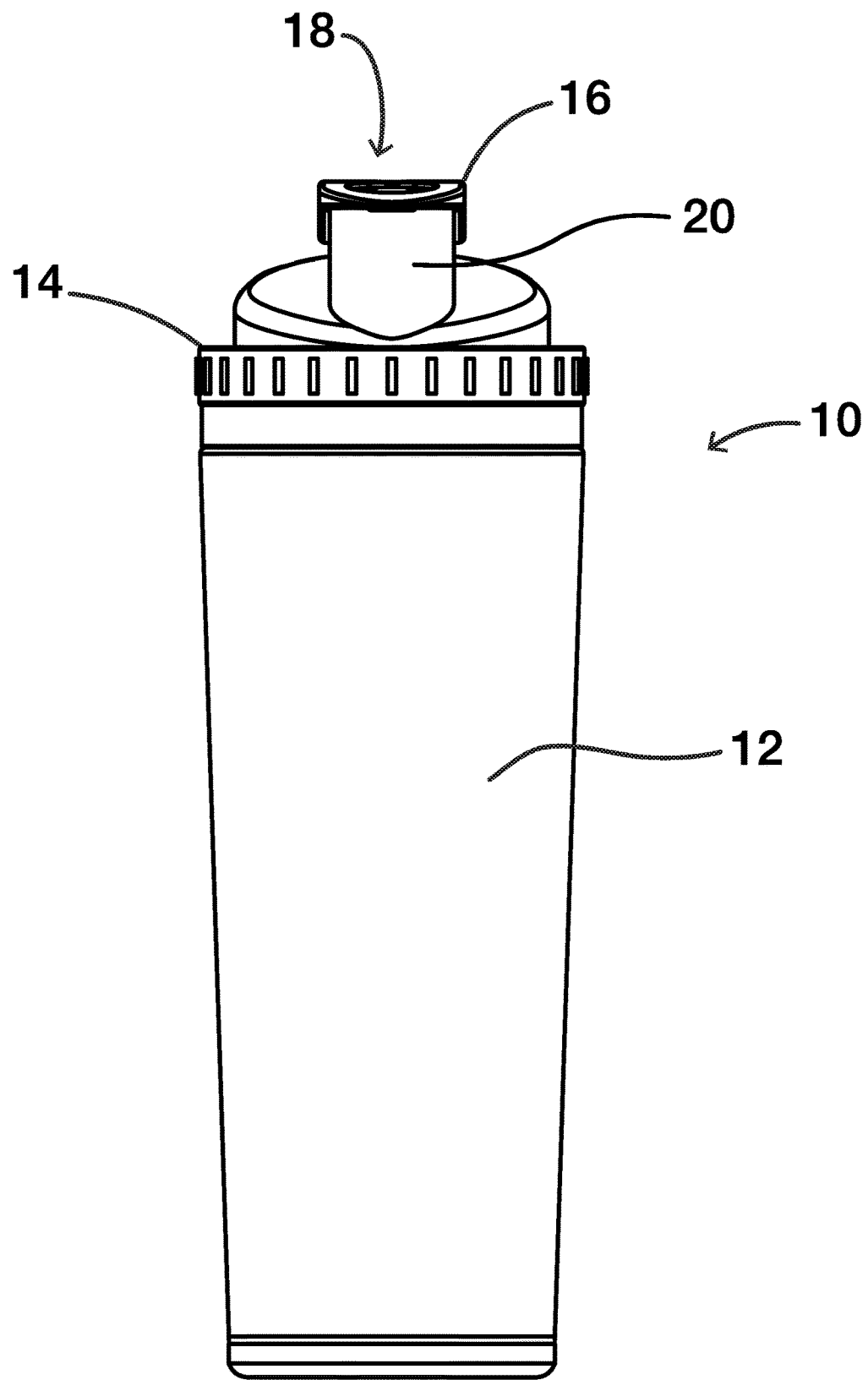
FIG. 3 is a left side view of a shaker cup according to an embodiment of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention relates to a water vessel that by its unique combination of shapes creates mixing turbulence, shear and eddy currents to quickly cause the powder to mix into a liquid without the use of an independent mixing element or agitator. The present invention accomplishes this through the combination of three unique elements which work together to create a greater result than the implementation of these elements on their own and, therefore, their combination creates a synergistic effect upon the mixing of a powder into a liquid.

From testing, it is observed that turbulence and agitation reach optimum levels when a cap having an angled surface with respect to the base of the vessel is coupled with a tapered annular sidewall of the vessel, with sufficient taper to assist in the mixing action, but not so much taper that the velocity of the liquid in the container when shaking in reduced because it is due to the long, slender middle section having a long length in proportion to the average diameter of the vessel that allows the liquid to reach a high velocity in the mid-section of the vessel. The long length versus diameter allows the liquid and powder to gain high velocity, and thus kinetic energy. The kinetic energy is then used in conjunction with the uniquely shaped surfaces in the hyper-turbulent zones to create high turbulence, shear force and eddy currents which act to more quickly mix the powder into the liquid.

From testing, it has been shown to be the combination of these elements that create a sufficiently synergistic level of turbulence, agitation and eddy currents to disperse the powder and mix it quickly into the liquid. The turbulence also prevents powder from accumulating in the corners of the vessel.

Because no separate, loose mixing elements are used within the vessel, yet sufficient mixing and dispersion of powder within the vessel are created by the fixed elements of the vessel, the present invention does not suffer from the added cost of a mixing element nor the hassle of a mixing element that must be cleaned. Further, when drinking, the user is not annoyed by a loose mixing element that bumps around in the vessel while tilting the vessel to drink.

To that end, and referring to the Figures generally, a preferred embodiment of the present invention comprises a shaker cup 10 comprising a vessel portion 12 and a cap portion 14. The cap portion 14 includes a closure 16 which can be moved to selectively open and close an opening 18 from which a user consumes liquid from a spout 20 of the cap portion 14 of the shaker cup 10. The cap portion 14 may also optionally comprise a handle 22.

Figure 4:
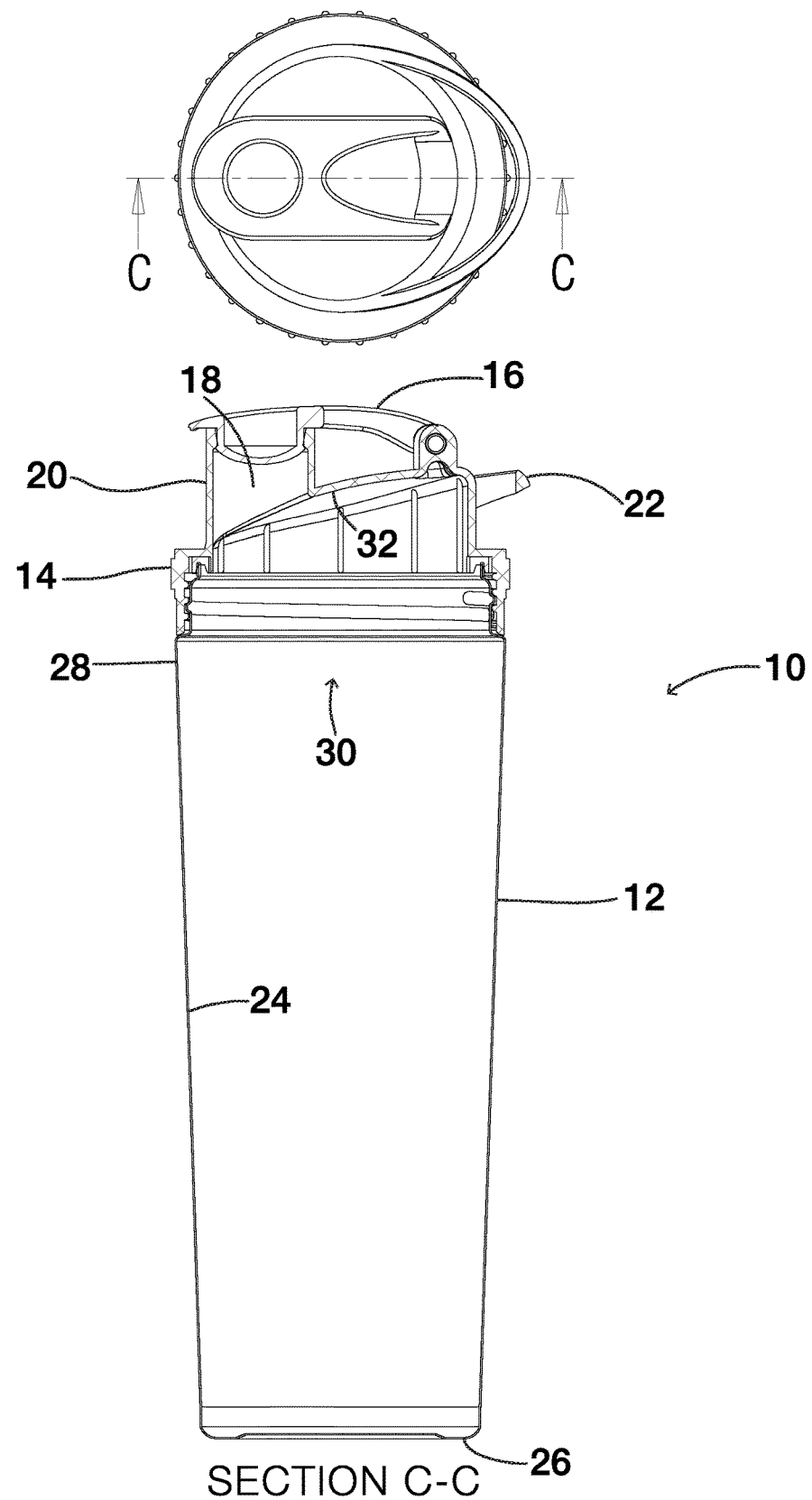
FIG. 4 is a left side section view of a shaker cup according to an embodiment of the present invention.

Referring now to FIG. 4, the vessel 12 of the shaker cup 10 comprises a tapered, annular side wall 24. In the preferred embodiment, the tapered side wall 24 comprises a taper of from about 0.5 inches per foot to about 1 inch per foot (any taper within that range), most preferably 0.75 inches per foot. In the preferred embodiment, a small end 26 of the vessel 12 is about 2.75 inches in diameter and a large end 28 is about 3.25 inches in diameter, with the vessel 12 being about 8 inches long.

The cap portion 14 further comprises an interior face 30 having an inner surface 32. The inner surface 32 preferably is angled with respect to a bottom surface 28 of the vessel 12 at an angle of from about 10 degrees to about 33 degrees (or any angle within that range), more preferably of from about 10 degrees to about 25 degrees (or any angle within that range) and most preferably about 15 degrees.

Preferably, the vessel 12 further has a length to average diameter ratio which is of from 2.5:1 to 3.5:1 and most preferably a ratio which is about 3:1. The long length in relation to the diameter allows the liquid and powder to reach a higher velocity in the vessel 12 when shaken, which promotes turbulence and mixing of the powder into the liquid. The higher velocity also creates more shear action of a greater force within the vessel when the liquid is deflected from the cap portion or constricted by the tapering sidewalls 24. In essence, the kinetic energy of the liquid vessel is dissipated in the form of turbulence and shear within hyper-turbulent zones (further explained below).

The shape described above was tested and compared to water vessels and caps consistent with the prior art, specifically:

TABLE 1

Testing Bottle Types

| | Taper/Straight Sidewalls | Flat/Angled Top | 2:1 Height to Diameter/ 3:1 Height to Diameter |
|---|---|---|---|
| Bottle 1 | Straight | Flat | 2:1 |
| Bottle 2 | Straight | Angled | 2:1 |
| Bottle 3 | Straight | Flat | 3:1 |
| Bottle 4 | Straight | Angled | 3:1 |
| Bottle 5 | Taper | Flat | 2:1 |
| Bottle 6 | Taper | Angled | 2:1 |
| Bottle 7 | Taper | Flat | 3:1 |
| Bottle 8 | Taper | Angled | 3:1 |

The tests were performed with 16 fluid ounces of water and 50 grams of an identical protein powder for shake times of 5, 10, 15, and 20 seconds and the results subjectively recorded in Table 2, below, noting whether any clumps of powder remained in the vessel. The vessel sizes of each shaker cup were each approximately 30 fluid ounces.

TABLE 2

Test Results

| Water Bottle Type | Shake Time | | | |
|---|---|---|---|---|
| | 5 sec | 10 sec | 15 sec | 20 sec |
| Bottle 1 | Significant clumping | Significant clumping | Significant clumping | Significant clumping |
| Bottle 2 | Significant clumping | Significant clumping | Significant clumping | Moderate clumping |
| Bottle 3 | Significant clumping | Significant clumping | Significant clumping | Moderate clumping |
| Bottle 4 | Significant clumping | Significant clumping | Moderate clumping | Some clumping |
| Bottle 5 | Significant clumping | Significant clumping | Significant clumping | Moderate clumping |
| Bottle 6 | Significant clumping | Significant clumping | Moderate clumping | Some clumping |
| Bottle 7 | Significant clumping | Significant clumping | Moderate clumping | Some clumping |
| Bottle 8 | Some clumping | No clumping | No clumping | No clumping |

Figure 5:
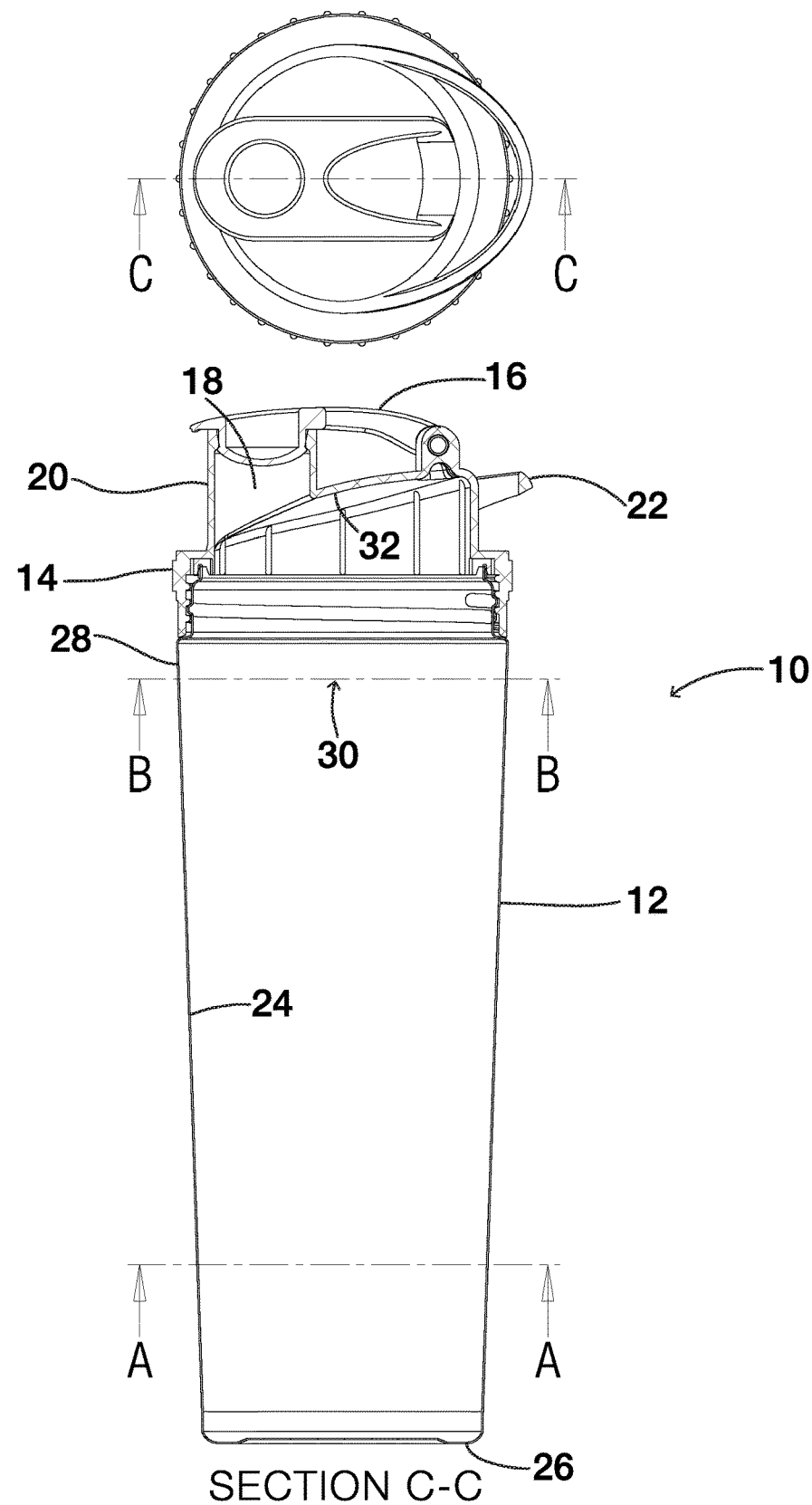
FIG. 5 is a left side section view of a shaker cup showing hyperturbulent zones according to an embodiment of the present invention.

Initially, powders will accumulate at the surface of the liquid medium and form large clumps. Based upon the experimentation by the present inventor, the combination of the tapered vessel, the angled top, inner surface of the cap and length to average diameter ratio creates greater turbulence, agitation and eddy currents during the shaking process to more quickly disperse clumps and mix the powder into the liquid. The combination of the elements of an angled top, tapered sidewall and long length to average diameter ratio create a combination of currents that work together to improve mixing action more than any of those elements can achieve individually. Referring to FIG. 5, the current flows of liquid created on an upward motion of the vessel while shaking cause the liquid to generate turbulence, shear and eddy current flows in a first hyperturbulent zone of area A-A. The current flows of liquid created on a downward motion of the vessel while shaking cause the liquid to generate turbulence, shear and eddy current flows in a second hyper-turbulent zone of area B-B. Because the vessel is not completely filled and because the length to average diameter ratio is between 2.5:1 and 3.5:1 and preferably 3:1, sufficient volume and length is permitted within the vessel to allow the liquid to gain significant velocity and kinetic energy within the vessel as the vessel is shaken. Preferably the vessel is filled no more than 80% full, more preferable no more than 70% and most preferably no more than 60% full. The increased speed allowed by the unfilled volume and long length (in comparison to average diameter) creates greater turbulence and mixing as the liquid is shaken within the vessel.

The above examples show that the invention, as defined by the claims, has far ranging application and should not be limited merely to the embodiments shown and described in detail. Instead the invention should be limited only to the explicit words of the claims, and the claims should not be limited to embodiments shown in the specification. The scope of protection is only limited by the scope of the accompanying claims.

I claim:

1. A shaker cup comprising:
   a cylindrical vessel having a bottom and tapered sidewalls that taper from a first, smaller diameter at the bottom of the vessel to a second, larger diameter at a top of the vessel, wherein the taper is from 0.5 inches per foot to 1 inch per foot;
   a cap removably attached to the vessel comprising a spout for drinking liquid from the vessel, wherein the cap is neither conical nor a dome;
   wherein the cap has an inner surface and the inner surface is angled from one side of the cap to the opposite side of the cap, with respect to the bottom of the vessel, at an angle of from 10 degrees to 33 degrees;
   wherein the ratio of a length from the top to the bottom of the vessel to the average diameter of the vessel is from 2.5:1 to 3.5:1;
   wherein when a liquid and a powder are placed into the shaker cup and the shaker cup containing the liquid and the powder is shaken, the combination of the tapered sidewalls of the vessel, the angled inner surface of the cap, and the ratio of the length from the top to the bottom of the vessel to the average diameter of the vessel creates mixing turbulence, shear, and eddy currents in the liquid to facilitate mixing the powder into the liquid; and
   wherein the shaker cup does not include any mixing element independent of and unattached from both the vessel and the cap.

2. The shaker cup of claim 1 wherein the ratio of the length from the top to the bottom of the vessel to the average diameter of the vessel is 3:1.

3. The shaker cup of claim 2 wherein the taper is 0.75 inches per foot.

4. The shaker cup of claim 3 wherein the inner surface of the cap is angled with respect to the bottom surface of the vessel at an angle of from 10 degrees to 25 degrees.

5. The shaker cup of claim 4 wherein the inner surface of the cap is angled with respect to the bottom surface of the vessel at an angle of 15 degrees.

6. A method of using a shaker cup comprising:
   providing the shaker cup, the shaker cup comprising a cylindrical vessel having a bottom and tapered sidewalls that taper from a first, smaller diameter at the bottom of the vessel to a second, larger diameter at a top of the vessel, wherein the taper is from 0.5 inches per foot to 1 inch per foot and a ratio of a length from the top to the bottom of the vessel to the average diameter of the vessel is from 2.5:1 to
   providing a cap for the shaker cup removably attached to the vessel comprising a spout for drinking liquid from the vessel, wherein the cap is neither conical nor a dome;
   wherein the cap has an inner surface and the inner surface is angled from one side of the cap to the opposite side of the cap, with respect to the bottom of the vessel, at an angle of from 10 degrees to 33 degrees;
   filling the shaker cup with a liquid and a powder to a level no more than 80% of a volume off the vessel;
   shaking the shaker cup for 5 seconds to mix the powder into the liquid;
   wherein when the shaker cup is shaken the combination of the tapered sidewalls of the vessel, the angled inner surface of the cap, and the ratio of the length from the top to the bottom of the vessel to the average diameter of the vessel creates mixing turbulence, shear, and eddy currents in the liquid to facilitate mixing the powder into the liquid; and
   wherein the shaker cup does not utilize a mixing element independent of and unattached from both the vessel and the cap.

7. The method of claim 6 wherein the ratio of the length from the top to the bottom of the vessel to the average diameter of the vessel is 3:1.

8. The method of claim 7 wherein the taper is 0.75 inches per foot.

9. The method of claim 8 wherein the inner surface of the cap is angled with respect to the bottom surface of the vessel at an angle of from 10 degrees to 25 degrees.

10. The method of claim 9 wherein the inner surface of the cap is angled with respect to the bottom surface of the vessel at an angle of 15 degrees.

11. The method of claim 10 wherein in the filling step, the shaker cup is filled no more than 70% of the volume of the vessel.

12. The method of claim 11 wherein in the filling step, the shaker cup is filled no more than 60% of the volume of the vessel.

* * * * *